Aug. 26, 1952  L. D. WATTS  2,608,419
SPRING MOUNTING FOR DIRIGIBLE ROAD WHEELS
Filed Aug. 11, 1949  3 Sheets-Sheet 2
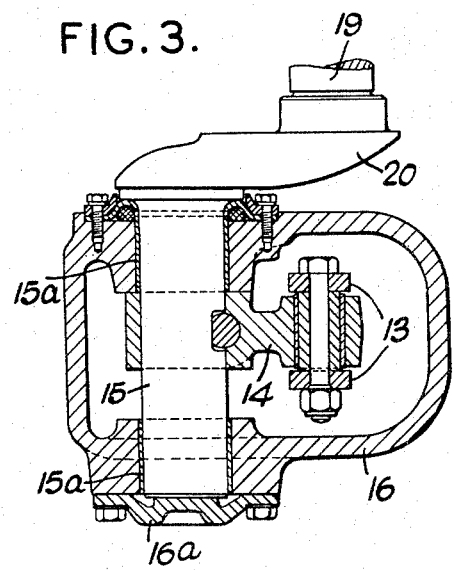
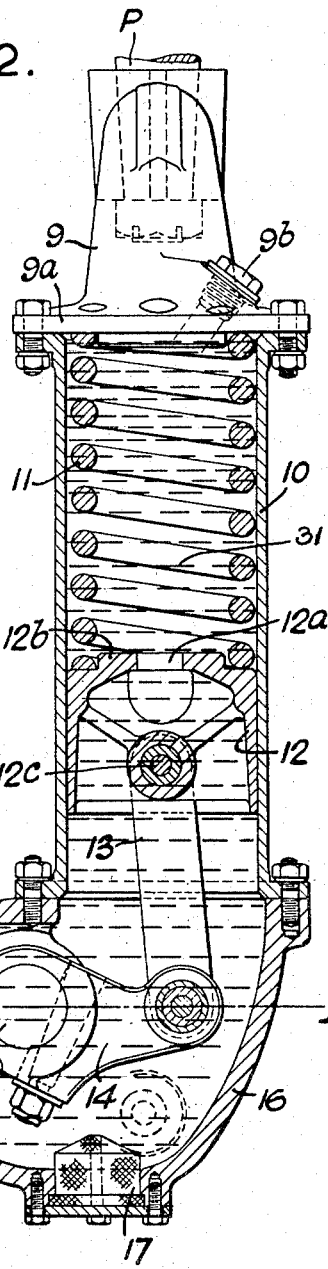
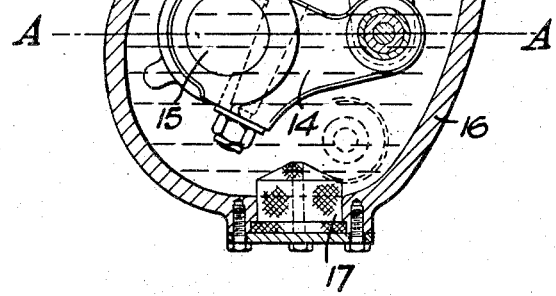

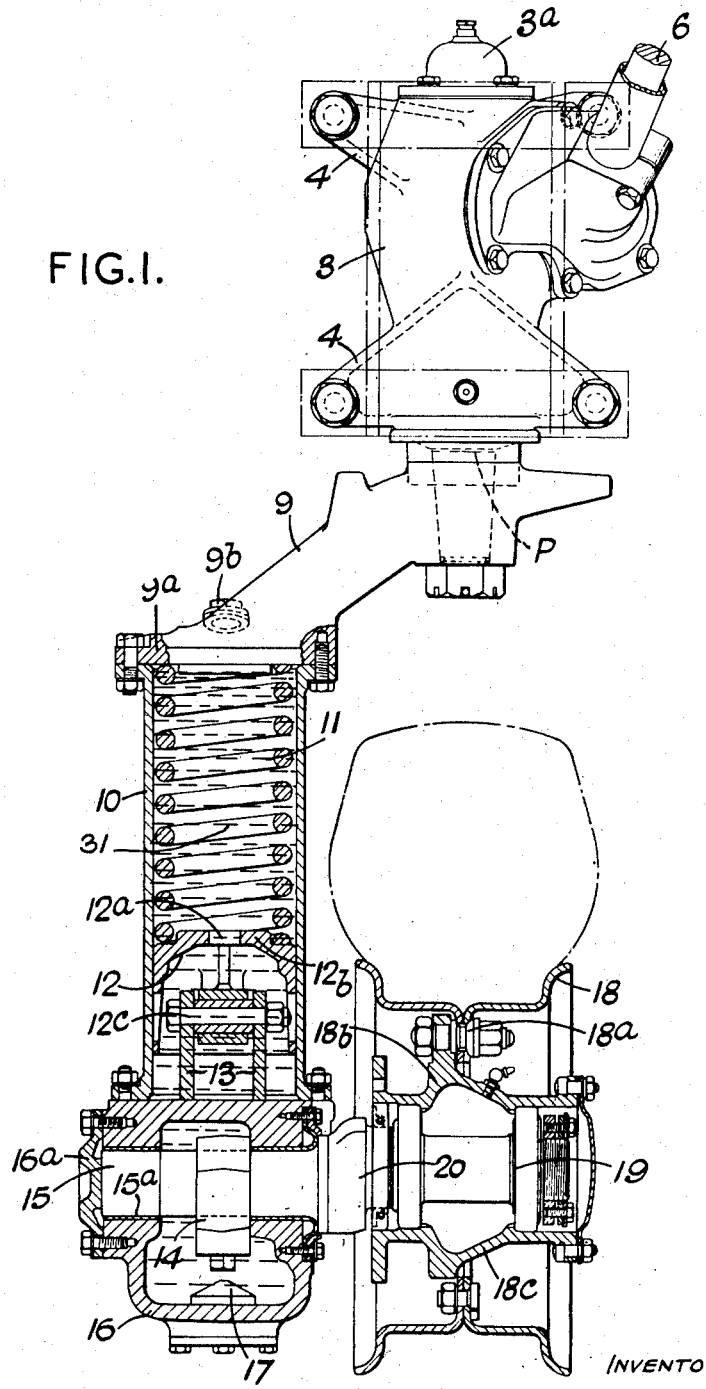
FIG.I.
INVENTOR
LAURENCE DEREK WATTS
per Worth Wade
ATTORNEY.

INVENTOR
LAURENCE DEREK WATTS
per *Worth Wade*
ATTORNEY.

UNITED STATES PATENT OFFICE 2,608,419

SPRING MOUNTING FOR DIRIGIBLE ROAD WHEELS

Laurence Derek Watts, Chorley Wood, England, assignor to Scammell Lorries Limited, Watford West, England, a British company Application August 11, 1949, Serial No. 109,772
In Great Britain September 15, 1948

3 Claims. (Cl. 280—96.2)

1

The present invention relates to improvements in and relating to the mounting and suspension of steering road wheels of vehicles.

The invention is primarily intended to be applied to individual steering road wheels in which the vehicle is three wheeled having a single steering wheel usually mounted at the front of the vehicle, but it is to be understood that the invention is applicable to vehicles where two steering road wheels are used, as for example a four wheel vehicle.

An object of the invention is to provide an improved simple and effective mounting and operating mechanism, and one in which the steering mechanism per se is mounted and combined with a front wheel suspension in such a manner as to permit relative movement between the wheel axle and the frame for the absorption of road shocks and to damp out oscillations.

Thus a mounting and suspension for a steering wheel according to the present invention comprises a steering pivot mounted in a housing or box and having gearing adapted to work in conjunction with gearing at the end of the steering column, an arm on said steering pivot attached to a suspension column, a shaft mounted at the lower end of the suspension column, a crank thereon, a wheel axle on said crank, and spring suspension means housed in the suspension column and acting on the aforesaid shaft, the parts being so arranged as to allow relative movement between the suspension column and its associated parts and the wheel axle and its associated parts.

The accompanying drawings illustrate by way of example the invention as applied to a three wheeled vehicle having a single steering wheel mounted at the front thereof.

In the drawings:

Fig. 1 is a rear view of the complete unit showing the mounting of the road wheel and the steering gear partly in section.

Fig. 2 is a vertical section, to a somewhat larger scale, through a spring suspension column hereinafter described.

Fig. 3 is a cross section on A—A of Fig. 2.

Figure 4:
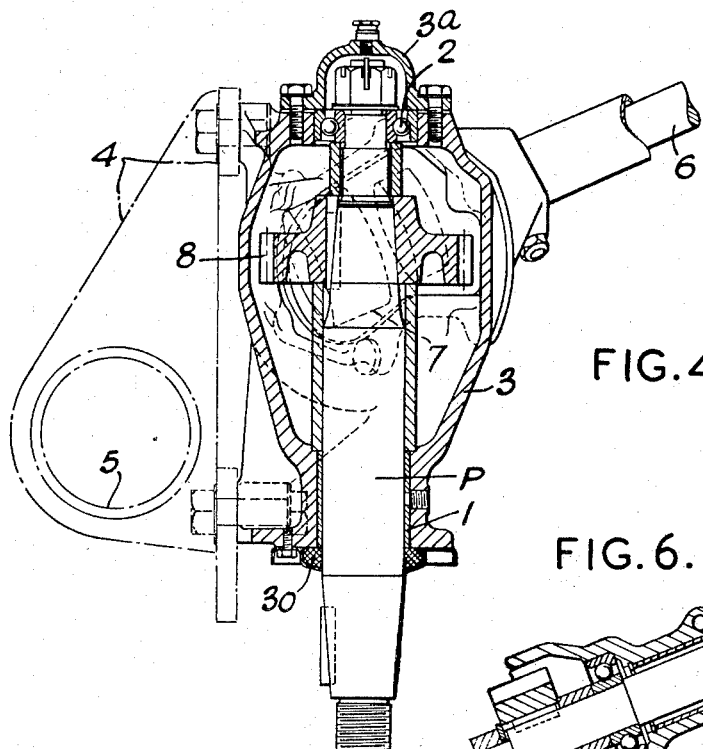
Fig. 4 is a vertical section of the steering gear on the axis of the steering pivot.
Figure 6:
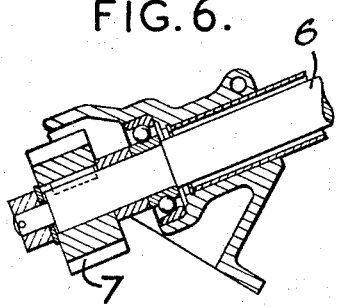
Fig. 6 is a detail sectional view of the lower end of the steering column.

The vehicle is guided by means of the usual steering wheel (not shown) through steering mechanism comprising the raked steering column 6 attached to the steering wheel aforesaid.

2

The steering gear, that is the gear which converts the rotary motion of the steering wheel into a fore and aft swing of the steering column 6 consists of a steering pivot P mounted in bearings 1 and 2 in a box or housing 3 secured by brackets 4 to a transverse frame member 5 of the chassis, which in the particular example is a three wheeled tractor. The bearings 1 and 2 may be of any suitable type, those shown being a ball bearing 2 and a plain journal or liner bearing 1.

The box or housing 3 has a cover cap 3a.

Figure 5:
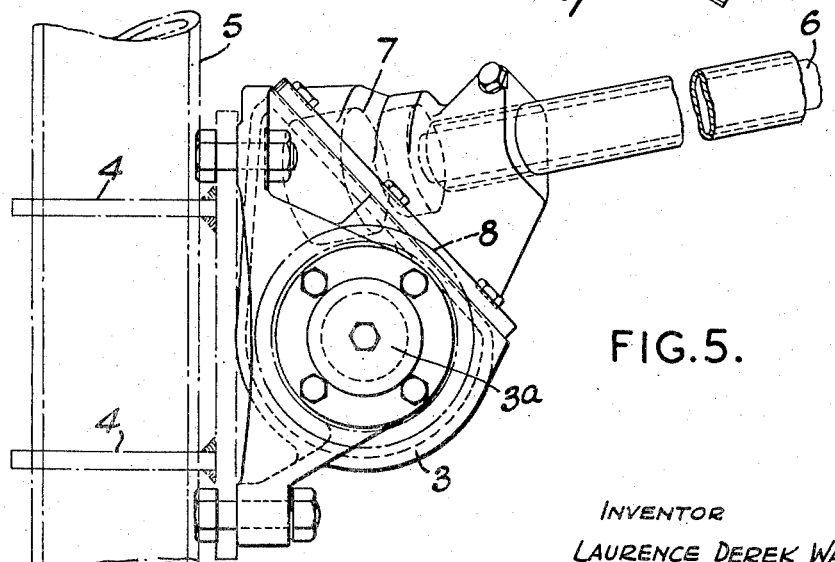
Fig. 5 is a plan view of the steering gear with the steering column broken away for convenience of illustration.

The steering column 6 carries a skew-gear or worm 7 gearing with a skew-gear or worm wheel 8 on the steering pivot P (see Figs. 1, 4 and 5). Other suitable kinds of steering mechanism may be used in lieu of the above.

A front spring suspension is provided.

On the lower end of the steering pivot P is secured a laterally directed arm 9, the end of which forms a cover 9a for a spring suspension hollow column or cylinder 10. Within this column is a coil spring 11. An additional spring or springs may be used and the springs may be arranged concentrically. The spring or springs work between the cover 9a and a piston 12.

The piston 12 is connected by a link 13 to a crank 14 on a transverse shaft 15 mounted in bearings 15a in a housing or casing 16 secured to the lower end of the suspension column 10. The housing 16 has an end cover plate 16a.

The suspension column 10 and the housing 16 are filled with suitable oil 31 to provide a hydraulic damper action on the piston 12. The aperture 12a in the piston 12 is of a size selected to effect the desired predetermined rate or degree of damping action. A removable plug 9b is provided in the cover 9a for inserting or replenishing the oil.

A resilient rebound bumper 17 is secured to the housing 16 to limit the downward movement of the piston 12. It will be seen that relative oscillating movement can take place between the suspension column 10 and the shaft 15.

The road wheel 18 is detachably mounted on an axle 19 on an external crank 20 of the shaft 15. The external crank 20 is preferably set at a suitable angle of about 15° to the internal crank 14.

As shown the road wheel 18 has a rim for holding a pneumatic or other tyre. The rim is clamped by bolts 18a to a flange 18b on the wheel hub 18c.

The piston 12 has a flange or boss 12b against which one end of the spring 11 is seated. The piston 12 is connected to the link 13 by the gudgeon pin 12c.

The housing 3 has a packing 30 which may consist of felt soaked in oil before fitting.

The steering column may be set at any suitable angle to the horizontal.

Where two steering road wheels are used for a four-wheeled vehicle only one steering gear is required as in this case the steering pivots or the arms 9 may be connected by the usual transverse steering link.

I claim:

1. In a wheeled vehicle, a steering wheel mounting comprising a cylinder having a cover on one end, a hollow housing closing the other end of said cylinder, a piston positioned within said cylinder, a compression spring positioned within said cylinder and positioned between and abutting the upper face of the piston and the lower surface of the cover and arranged to act against said piston, a shaft passing through said housing transverse to said cylinder, two cranks mounted on said shaft, one of said cranks being mounted on that portion of the shaft which is enclosed within said housing and being connected to said piston by means of a link, the second crank being positioned on one end of said shaft outside said housing and having a wheel mounted thereon, an aperture in said piston providing communication between the cylinder and said housing, and a fluid contained in the space enclosed by said cylinder and said housing to dampen movement of said piston caused by oscillation of said wheel.

2. A steering wheel mounting as recited in claim 1 including an arm, one end of said arm secured to the upper surface of said cylinder cover and the other end of said arm adapted to be mounted on a steering pivot.

3. A steering wheel mounting as recited in claim 1 including a resilient bumper secured within said housing and in the path of travel of said first crank to limit downward movement of said first mentioned crank which is enclosed within said housing.

LAURENCE DEREK WATTS.

REFERENCES CITED

The following references are of record in the file of this patent:

UNITED STATES PATENTS

| Number | Name | Date |
|---|---|---|
| 2,105,246 | Horsfield | Jan. 11, 1938 |
| 2,220,254 | Maier | Nov. 5, 1940 |

FOREIGN PATENTS

| Number | Country | Date |
|---|---|---|
| 457,608 | Great Britain | Dec. 2, 1936 |
| 458,685 | Great Britain | Dec. 21, 1936 |
| 807,068 | France | Jan. 4, 1937 |